April 7, 1964 D. B. ARMSTRONG 3,128,449

ERROR DETECTING AND CORRECTING SYSTEM

Filed June 14, 1960 11 Sheets-Sheet 1

PRIOR ART NONREDUNDANT COUNTING SYSTEM

EXCLUSIVE OR CIRCUIT

INVENTOR
D. B. ARMSTRONG
BY Lucian C. Canepa
ATTORNEY

REDUNDANT ERROR DETECTING AND CORRECTING COUNTING SYSTEM

INVENTOR
D. B. ARMSTRONG
BY Lucian C. Canepa
ATTORNEY

INVENTOR
D. B. ARMSTRONG
BY Lucian C. Canepa
ATTORNEY

FIG. 5

| STATE OF COUNTING SYSTEM | EVEN PARITY CHECK SIGNALS | | | |
|---|---|---|---|---|
| | 215 | 216 | 217 | 218 |
| $S_1$ | 1 | 1 | 1 | 1 |
| $S_2$ | 0 | 0 | 0 | 1 |
| $S_3$ | 0 | 1 | 1 | 1 |
| $S_4$ | 0 | 0 | 0 | 0 |
| $S_5$ | 1 | 0 | 0 | 1 |
| $S_6$ | 0 | 1 | 0 | 1 |
| $S_7$ | 1 | 0 | 0 | 0 |
| $S_8$ | 1 | 0 | 1 | 0 |
| $S_9$ | 0 | 1 | 1 | 0 |
| $S_{10}$ | 1 | 1 | 0 | 1 |
| $S_{11}$ | 0 | 0 | 1 | 1 |
| $S_{12}$ | 1 | 1 | 1 | 0 |
| $S_{13}$ | 1 | 1 | 0 | 0 |
| $S_{14}$ | 0 | 1 | 0 | 0 |
| $S_{15}$ | 0 | 0 | 1 | 0 |
| $S_{16}$ | 1 | 0 | 1 | 1 |

TRUTH TABLE OR DEFINITIVE SPECIFICATION OF PARITY CHECK GENERATING LOGIC CIRCUIT SHOWN IN FIG. 2A

FIG. 3A

| STATE OF COUNTING SYSTEM | OUTPUT SIGNALS | | | | DERIVATION OF OUTPUT SIGNALS |
|---|---|---|---|---|---|
| | 101 | 102 | 103 | 104 | |
| $S_1$ | 0 | 0 | 1 | 1 | $S_{16}$, 1 OR $S_1$, 0 |
| $S_2$ | 1 | 1 | 1 | 0 | $S_1$, 1 OR $S_2$, 0 |
| $S_3$ | 1 | 1 | 0 | 0 | $S_2$, 1 OR $S_3$, 0 |
| $S_4$ | 0 | 0 | 0 | 0 | $S_3$, 1 OR $S_4$, 0 |
| $S_5$ | 0 | 0 | 0 | 1 | $S_4$, 1 OR $S_5$, 0 |
| $S_6$ | 0 | 1 | 1 | 1 | $S_5$, 1 OR $S_6$, 0 |
| $S_7$ | 1 | 1 | 1 | 1 | $S_6$, 1 OR $S_7$, 0 |
| $S_8$ | 0 | 1 | 0 | 0 | $S_7$, 1 OR $S_8$, 0 |
| $S_9$ | 0 | 0 | 1 | 0 | $S_8$, 1 OR $S_9$, 0 |
| $S_{10}$ | 1 | 0 | 0 | 0 | $S_9$, 1 OR $S_{10}$, 0 |
| $S_{11}$ | 0 | 1 | 0 | 1 | $S_{10}$, 1 OR $S_{11}$, 0 |
| $S_{12}$ | 1 | 1 | 0 | 1 | $S_{11}$, 1 OR $S_{12}$, 0 |
| $S_{13}$ | 0 | 1 | 1 | 0 | $S_{12}$, 1 OR $S_{13}$, 0 |
| $S_{14}$ | 1 | 0 | 0 | 1 | $S_{13}$, 1 OR $S_{14}$, 0 |
| $S_{15}$ | 1 | 0 | 1 | 1 | $S_{14}$, 1 OR $S_{15}$, 0 |
| $S_{16}$ | 1 | 0 | 1 | 0 | $S_{15}$, 1 OR $S_{16}$, 0 |

TRUTH TABLE OR DEFINITIVE SPECIFICATION OF LOGIC CIRCUIT SHOWN IN FIGS. 1 AND 2A

INVENTOR
D. B. ARMSTRONG
BY Lucian C. Canepa
ATTORNEY

April 7, 1964 D. B. ARMSTRONG 3,128,449

ERROR DETECTING AND CORRECTING SYSTEM

Filed June 14, 1960 11 Sheets-Sheet 5

LOGIC CIRCUIT OF FIG. 1

INVENTOR
D. B. ARMSTRONG
BY Lucian C. Canepa
ATTORNEY

ERROR DETECTING AND CORRECTING SYSTEM

Filed June 14, 1960 11 Sheets-Sheet 6

INVENTOR
D. B. ARMSTRONG
BY Lucian C. Canepa
ATTORNEY

FIG. 4A

| BLOCK NO. 1 p DIGITS (OR LEADS) | BLOCK NO. 2 p DIGITS (OR LEADS) | BLOCK NO. 3 p DIGITS (OR LEADS) | BLOCK NO. 4 p DIGITS (OR LEADS) | BLOCK NO. 5 p DIGITS (OR LEADS) | | BLOCK NO. q p DIGITS (OR LEADS) |
|---|---|---|---|---|---|---|
| X X - - - - - X | X X - - - - - - X | X X - - - - - - X | X X - - - - - - X | X X - - - - - X | | X X - - - - - X |
| n + k = p q DIGITS (OR LEADS) | | | | | | |

FIG. 4B

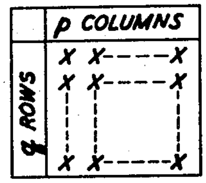

FIG. 4C

ERROR DETECTING AND CORRECTING CODES FOR VARIOUS VALUES OF p AND q

| FAMILY NO. 1 | | FAMILY NO. 2 | | | FAMILY NO. 3 | | | |
|---|---|---|---|---|---|---|---|---|
| 1 X | 2 X | 1 X | 56 X | 24 X | 1 X | 5 X | 23 X | 46 X |
| 3 X | 4 X | 3 X | 15 X | 25 X | 2 X | 6 X | 38 X | 57 X |
| 14 X | 23 X | 5 X | 146 X | 36 X | 3 X | 7 X | 14 X | 58 X |
| 13 X | 124 X | 6 X | 34 X | 2 X | 4 X | 8 X | 12 X | 67 X |
| 24 X | 123 X | 4 X | 126 X | 35 X | 18 X | 25 X | 36 X | 47 X |
| | | 13 X | 46 X | 1245 X | 16 X | 24 X | 58 X | 378 X |
| | | 16 X | 456 X | 23 X | 13 X | 27 X | 56 X | 478 X |
| | | 14 X | 125 X | 236 X | | | | |
| | | 45 X | 136 X | 256 X | | | | |
| p = 2 q = 3, 4, 5 | | p = 3 q = 5, 6, 7, 8, 9 | | | p = 4 q = 4, 5, 6, 7 | | | |

INVENTOR
D. B. ARMSTRONG
BY Lucian C. Canepa
ATTORNEY

INVENTOR
D. B. ARMSTRONG
BY Lucian C. Canepa
ATTORNEY

SWITCHING CIRCUIT OF FIG. 2A

INVENTOR
D. B. ARMSTRONG
BY Lucian C. Canepa
ATTORNEY

PARITY RECONSTRUCTION CIRCUIT OF FIG. 2B

INVENTOR
D. B. ARMSTRONG
BY Lucian C. Canepa
ATTORNEY

April 7, 1964 D. B. ARMSTRONG 3,128,449

ERROR DETECTING AND CORRECTING SYSTEM

Filed June 14, 1960 11 Sheets-Sheet 11

ERROR LOGIC CIRCUIT OF FIG. 2B

INVENTOR
D. B. ARMSTRONG
BY Lucian C. Canepa
ATTORNEY 3,128,449
Patented Apr. 7, 1964

3,128,449

ERROR DETECTING AND CORRECTING SYSTEM

Douglas B. Armstrong, Bedminster, N.J., assignor to Bell Telephone Laboratories, Incorporated, New York, N.Y., a corporation of New York Filed June 14, 1960, Ser. No. 35,920
1 Claim. (Cl. 340—146.1)

This invention relates to digital information processing system, and more particularly to the detection and correction of errors in such systems.

Considerable effort has been directed in recent years to increasing the reliability of digital information processing systems. This effort, which has usually involved the use of redundancy in one form or another, has extended both to the problem of compensating for errors which occur in information-generating equipment and to the problem of compensating for errors which occur on a transmission channel associated with the equipment. Significant increases in equipment reliability are attainable by selectively replicating the components of the equipment; the quadruplication techniques disclosed in J. G. Tryon Patent 2,942,193, issued June 21, 1960, are illustrative of this approach. Another approach is based on the use of error codes, for example, those of the type disclosed in R. W. Hamming-B. D. Holbrook Reissue Patent 23,601, issued December 23, 1952; this approach is applicable to the detection and correction of errors both in the information-generating equipment and on the transmission channel associated therewith.

An object of the present invention is the improvement of digital information processing systems.

More specifically, an object of this invention is the detection and correction of errors in such systems.

These and other objects of the present invention are realized in a specific illustrative embodiment thereof which includes an information-generating circuit in combination with a parity check generating logic circuit. Both the information-generating circuit and the parity circuit are divided into a number of electrically-independent subcircuits, such that a single fault occurring in a given subcircuit causes errors to appear only at the output terminals of the given subcircuit. Accordingly, the error correcting codes in accordance with whose requirements the illustrative parity circuit is formed need only have the capability of correcting any error pattern which occurs at the output terminals of a single subcircuit. As a result, it is found that much more efficient error correcting codes can be used than if the information-generating circuits were not divided into electrically-independent subcircuits. Significantly, as the efficiency of an error correcting code increases, the code requires a smaller proportion of check digits to information digits, which means, as a practical matter, that the amount of parity check generating circuitry correspondingly decreases.

Coupled to both the information-generating circuit and the parity circuit is an error detecting unit that responds to the reception of an erroneous signal pattern which arises from a fault in the information-generating circuit by energizing an alarm device and by generating correction signals. These correction signals are applied to a corrector circuit associated with the information-generating circuit, thereby providing automatic error correction of the output signals of the information-generating circuit.

In the case wherein the erroneous pattern of signals received by the error detecting unit stems from a fault in the parity circuit, only error detection, viz., energization of an alarm device, is provided by the error detecting unit.

The occurrence of a fault in the error detecting unit of the illustrative embodiment causes an alarm indication of the fault condition to occur and, further, in view of the possible unreliability of the correction signals being then coupled from the error detecting unit to the corrector circuit associated with the information-generating circuit, causes the corrector circuit to be bypassed.

Similarly, the occurrence of a fault in the corrector circuit results in the energization of an alarm device and the bypassing of the faulty corrector circuit.

A system embodying the novel error detecting and correcting principles of the present invention detects and automatically corrects those errors which would cause the output signals of the information-generating circuit to be erroneous. The detection of errors, coupled with efficient diagnostic or trouble-shooting routines, makes it possible for the system to continue operating satisfactorily even when a faulty circuit is removed from the system for repair. Thus, for example, the detection of an error which stems from a fault in one of the electrically-independent subcircuits of the information-generating circuit would lead to removal of the faulty subcircuit for repair purposes. This removal would, at the worst, cause all of the output signals of that subcircuit to be erroneous. But, since the error correcting codes embodied in the system are capable of correcting any pattern of errors which appears at the outputs of a single subcircuit, the system would provide error correction of that erroneous pattern. Therefore, the system would continue to operate correctly even during the removal of the faulty subcircuit.

It is a feature of the present invention that a digital information processing system include an information-generating circuit and a parity check generating logic circuit which are both divided into a number of electrically-independent subcircuits.

It is another feature of this invention that a digital information processing system include an information-generating circuit and a parity check generating logic circuit both divided into a number of electrically-independent subcircuits, and that the error correcting codes in accordance with which the parity circuit is formed be capable of detecting and correcting any erroneous signal pattern that appears at the output terminals of any subcircuit.

It is still another feature of the present invention that a digital information processing system include an information-generating circuit comprising a number of electrically-independent subcircuits, a parity circuit comprising a number of electrically-independent subcircuits, and an error detecting unit responsive to output signals from the electrically-independent subcircuits for both detecting the presence of an erroneous signal from the subcircuits and for supplying correction signals to a corrector circuit associated with the information-generating circuit.

A complete understanding of the present invention and of the above and other features and advantages thereof may be gained from a consideration of the following detailed description of an illustrative embodiment thereof presented hereinbelow in connection with the accompanying drawing, in which:

FIG. 1 is a block diagram of a nonredundant counting system including logic and memory circuits which are susceptible to faults and to which it is desired to add error detecting and correcting capabilities;

FIGS. 2A and 2B considered together depict in block diagram form a redundant error detecting and correcting counting system made in accordance with the principles of the present invention;

FIG. 3A is a truth table or definitive specification for the logic circuit shown in FIGS. 1 and 2A;

FIG. 4A depicts the pattern according to which the output leads of the logic circuit and its associated parity circuit are divided into *q* blocks which each include *p* leads;

FIG. 4B shows the blocks of FIG. 4A rearranged to form the rows of a matrix configuration, thereby to facilitate the design of suitable error codes for embodiments of the principles of this invention;

FIG. 4C depicts one specific set of error detecting and correcting codes in accordance with which illustrative embodiments of the principles of the present invention may be implemented;

FIG. 5 is a truth table or definitive specification for the parity check generating logic circuit shown in FIG. 2A;

Figure 1:
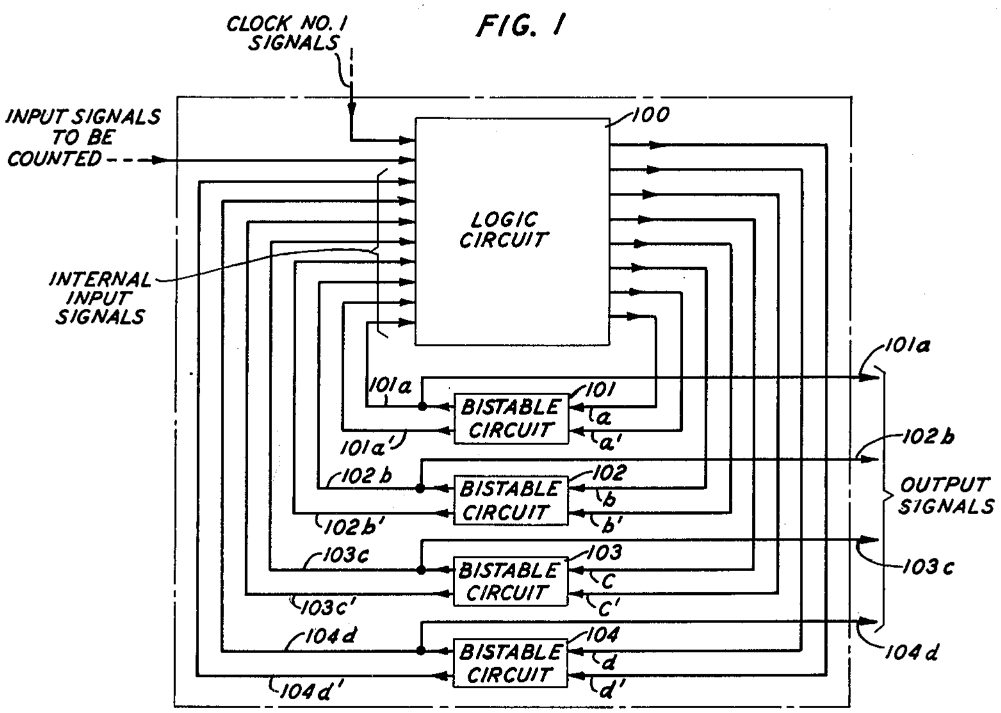

Referring now to FIG. 1, there is shown a prior art nonredundant, synchronous, finite state, sequential system arranged to operate as a counter. The system includes a logic circuit 100 and four bistable circuits 101, 102, 103, and 104. Output signals from the logic circuit 100 are coupled to the bistable circuits 101 through 104 in a two-rail mode. In other words, the eight output leads from the logic circuit 100 are grouped into four pairs and the leads of a pair carry mutually complementary signal indications. More specifically, the coupling of a "1" signal from the output leads *a* and *a'* of the logic circuit 100 to the bistable circuit 101 is represented by a "1" signal on the lead *a* and a "0" signal on the lead *a'*. Conversely, the coupling of a "0" signal from the logic circuit 100 to the bistable circuit 101 is represented by a "0" signal on the lead *a* and a "1" signal on the lead *a'*.

Each of the bistable circuits 101 through 104 responds to the application thereto of a "1" signal by providing a "1" signal output, i.e., in the case of the bistable circuit 101, a "1" signal on the lead 101*a* and a "0" signal on the lead 101*a'*, remaining in that condition or state until a "0" signal is applied thereto, at which time the circuit provides a "0" signal output. This type of circuit operation is well known in the art and any one of a number of available bistable or flip-flop circuits, for example, the Eccles-Jordan flip-flop, is suitable for implementing the circuits 101 through 104.

As seen in FIG. 1, the logic circuit 100 has as inputs thereto the output indications of the bistable circuits 101 through 104, input signals to be counted, and clock No. 1 signals. Assume, referring to FIG. 3A, that the counting system shown in FIG. 1 is at a given intsant of time in the state designated $S_7$. (In this state of the counting system each of the output leads 101*a*, 102*b*, 103*c*, and 104*d* has a "1" signal thereon.) The coincidence of a clock No. 1 signal and an input "1" signal to be counted then causes the bistable circuits 101 through 104 to be selectively switched to represent the output signal pattern 0100, as indicated in FIG. 3A in the row containing $S_8$. On the other hand, the coincidence of a clock No. 1 signal and an input "0" signal causes the counting system to remain in its $S_7$ state. Note that the third column of FIG. 3A indicates the necessary combination of inputs to the logic circuit 100 to produce a given state of the counting system. For example, state $S_7$ results from a combination of the circuit being in state $S_6$ and the application to the system of a "1" input signal to be counted, or from a combination of the system being already in state $S_7$ and the application thereto of a "0" input signal to be counted.

Each coincidence of a clock No. 1 signal and an input "1" signal causes the counting system of FIG. 1 to step in sequence from one to the next of its sixteen stable states. The operation of the logic circuit 100 of the system is completely specified by the truth table of FIG. 3A. In accordance with that definitive specification and well-known techniques of constructing a circuit from a truth table or "table of combinations" (see, for example, in this latter regard, sections 4–3 through 4–6, and chapter 9 of "Switching Circuits and Logical Design," S. H. Caldwell, John Wiley & Sons, 1958), it is a straightforward step to implement the logic circuit 100 to perform the functions defined herein.

Figure 3B:
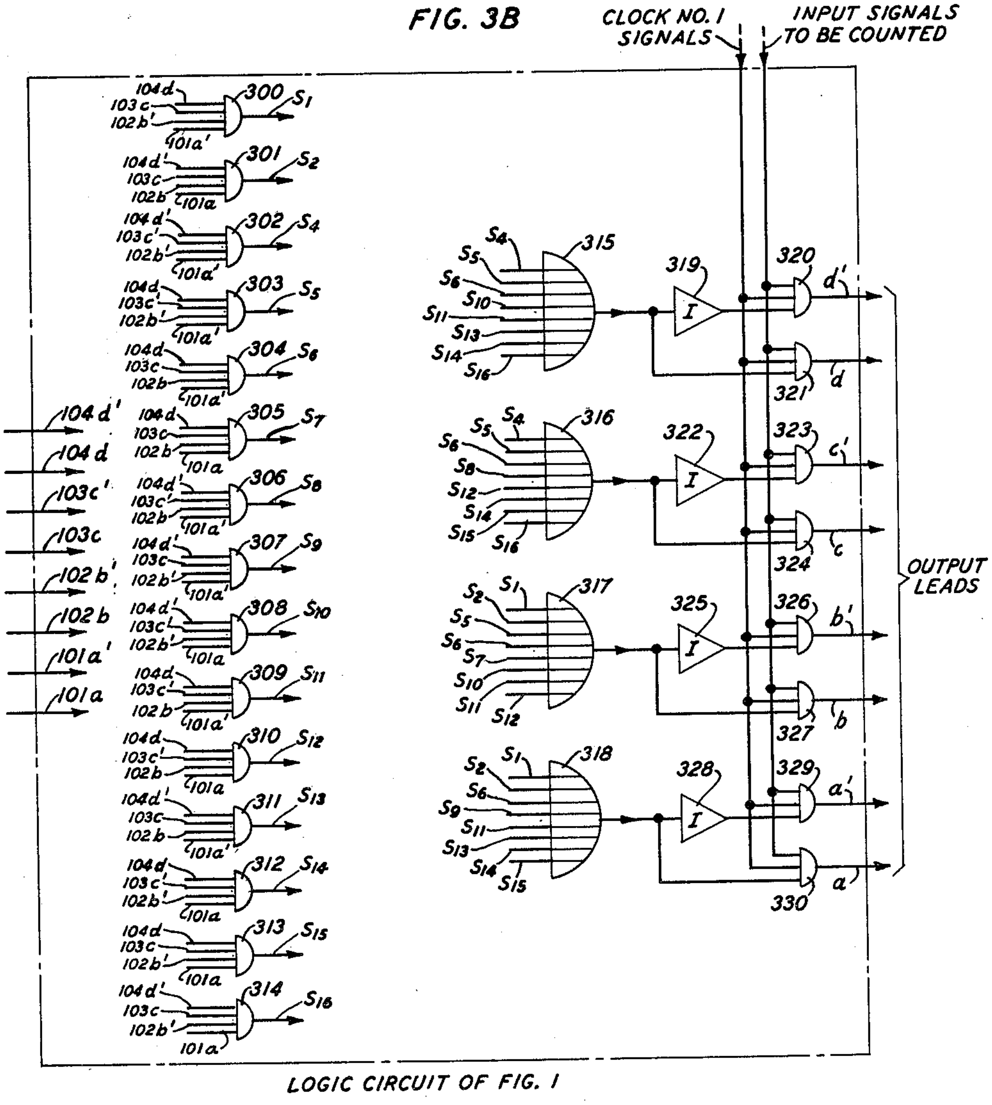
FIG. 3B is a schematic diagram of the logic circuit shown in FIG. 1.

FIG. 3B illustrates a specific logic circuit formed in accordance with such a straightforward implementation. In order not to unduly complicate the showing of FIG. 3B, various interconnections therein have not actually been drawn in, but, instead, have been clearly indicated by labeling the leads that are shown. Thus, for example, both the uppermost one of the left-hand set of input leads to the logic circuit and selected ones of the input leads to AND units 300 through 314 are labeled 104*d'*. These identically-labeled leads should, in fact, be connected together. Similarly, the output leads of the AND units 300 through 314 and the input leads of OR units 315 through 318 are labeled to indicate the specific manner in which the interconnections therebetween should be made. This type of interconnection representation is also employed in the showings of FIGS. 3C, 8, and 9.

An understanding of what is meant herein by the term "electrically-independent" is essential to a comprehension of the basic principles of the present invention. The term "electrically-independent" is intended to refer to that relationship between two circuits in which no signals generated in one circuit are coupled to the other circuit. (Input signals, it is noted, may be common to two electrically-independent circuits.) As a result, error signals generated in a given circuit cannot feed into or infect another circuit which is related in an electrically-independent way to the given circuit.

Referring again to FIG. 3B, the circuit there shown may be considered to include four subcircuits each of which is coupled to a pair of output leads. For example, one such subcircuit includes the OR unit 315, an inverter unit 319, and AND units 320 and 321. The units 316, 322, 323, and 324, the units 317, 325, 326, and 327, and the units 318, 328, 329, and 330 respectively form portions of the other three subcircuits. By the terms of the definition given in the paragraph immediately above, neither the individual subcircuits of the circuit of FIG. 3B nor any pair thereof are electrically-independent with respect to each other. This is evident by noting that the output of the AND unit 304 is coupled to every one of the OR units 315 through 318. Furthermore, a number of other interconnections exist among the subcircuits. For example, the output of the AND unit 303 is coupled to each of the OR units 315, 316, and 317, and the output of the AND unit 312 is coupled to each of the OR units 315, 316, and 318.

Figure 3C:
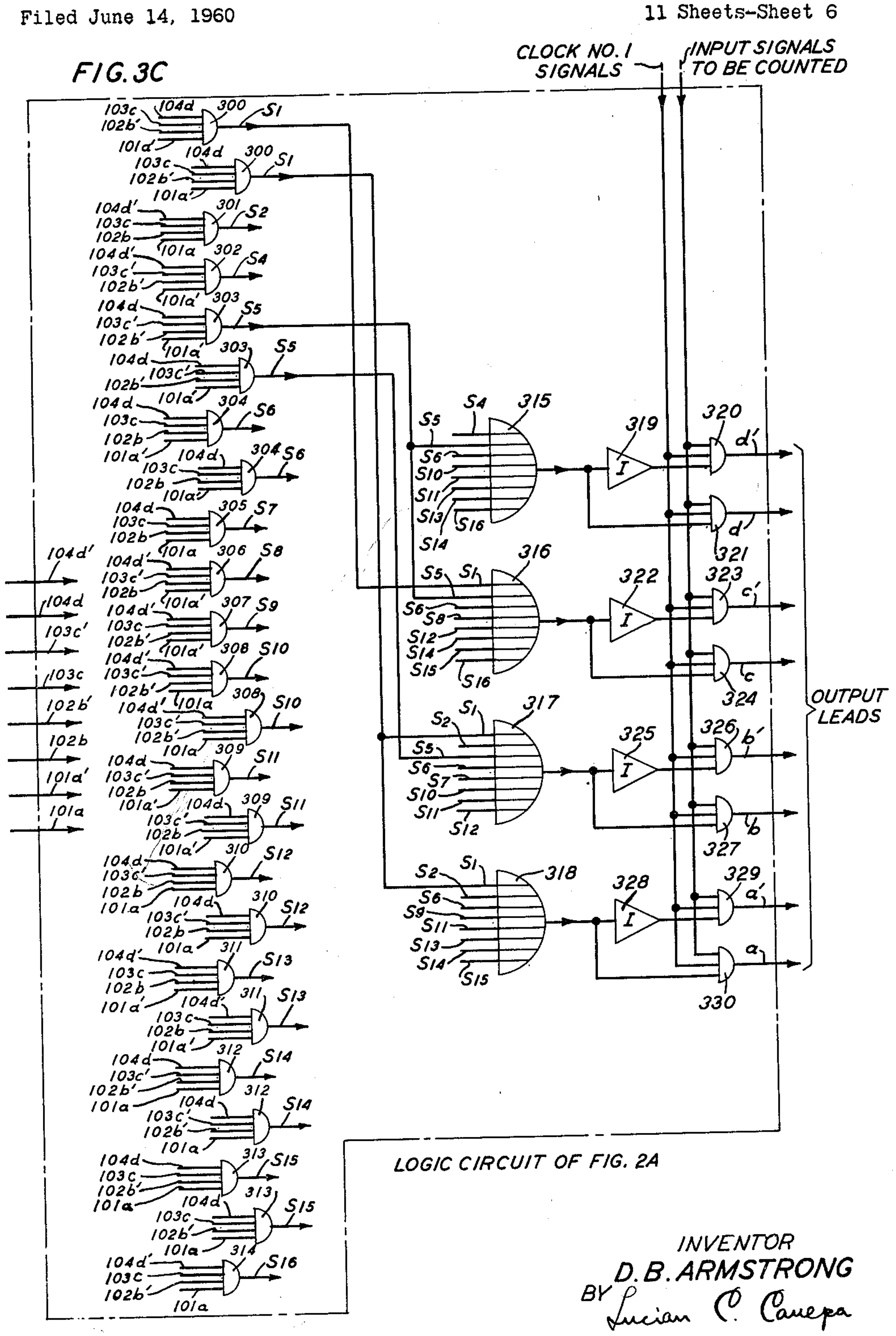
FIG. 3C is a schematic diagram of the logic circuit shown in FIG. 2A.

The circuit shown in FIG. 3C is a modified version of the logic circuit shown in FIG. 3B. Specifically, the circuit of FIG. 3C is arranged to include two electrically-independent subcircuits. One of these subcircuits includes the OR units 315 and 316 and provides output signals to the leads *c*, *c'*, *d*, and *d'*. The other subcircuit of FIG. 3C includes the OR units 317 and 318 and provides output signals to the leads *a*, *a'*, *b*, and *b'*. An inspection of FIG. 3C reveals that these two specified subcircuits are electrically-independent, i.e., no one of the AND units whose output leads are designated $S_1$ through $S_{16}$ is coupled to both of the two subcircuits.

Electrical independence of the two subcircuits of FIG. 3C was achieved simply by duplicating every input AND unit whose output extended to either or both of the OR units 315 and 316 *and* to either or both of the OR units 317 and 318. Accordingly, FIG. 3C shows duplicates of the AND units 300, 303, 304, 308, 309, 310, 311, 312, and 313. Otherwise, FIG. 3C is identical to FIG. 3B.

In general, a given circuit may be converted into one having any desired number of electrically-independent subcircuits by starting at the output leads of the given circuit and, in the process of working back toward the input leads thereof, replicating every signal-generating component which is coupled to more than one of the specified subcircuits, the amount of replication being directly dependent upon the number of subcircuits to which a component is coupled. For example, if it were desired to convert the circuit of FIG. 3B into one having four electrically-independent subcircuits, the AND unit 304 would have to be quadruplicated and the four resulting AND units would then be respectively coupled to the four subcircuits. Clearly, in such a case, a fault which occurred in a single AND unit 304 would cause an error signal to appear only at the output of the single subcircuit coupled to the faulty AND unit. Others of the input AND units would also, of course, have to be replicated.

Alternatively, the circuits to be error-corrected may advantageously be originally designed so as to initially possess the property of electrical independence. This can be achieved, for example, by designing the logic circuit which is coupled to each output wire such that the circuit is a separate entity, and then combining, where desirable, those circuits which feed the output wires emanating from a particular electrically-independent subcircuit.

In accordance with the principles of the present invention, a logic circuit has associated therewith a parity check generating circuit and the two circuits are divided into $q$ electrically-independent subcircuits each of which provides $p$ of the total outputs of the two circuits. This pattern of separation of the total outputs is depicted in FIG. 4A.

FIG. 4B shows the $q$ blocks of FIG. 4A rearranged to form the rows of a matrix configuration. Because the $q$ blocks of the output leads are respectively coupled to different ones of the electrically-independent subcircuits, a single fault which occurs in a subcircuit causes an error pattern to appear in only one of the $q$ blocks. Thus, looking at the matrix of FIG. 4B, it is seen that an error pattern which arises from a single fault is confined to a single row of the matrix; hence, it is necessary to provide error detecting and correcting codes which are capable of correcting every possible pattern of errors in a single row. Excluding the no-error pattern, the total number of error patterns in a row is $2^p-1$. Therefore, the total number of error patterns in the matrix of FIG. 4B is $q(2^p-1)$.

Next, it is necessary to determine the minimum number $k$ of check digits which are required to provide the desired error detecting and correcting capabilities in a system illustratively embodying the principles of this invention. Obviously, $k$ must be large enough to permit as many parity failure patterns as there are error patterns. This requires that k satisfy the inequality $2^k-1 \geq q(2^p-1)$ or $$k \geq [\log_2 (q2^p-q+1)] \qquad (1)$$

where the square brackets are intended to indicate that $k$ is the smallest integer satisfying expression (1).

Another lower bound on $k$ exists, which, for many values for $p$ and $q$, is greater than that imposed by expression (1). This other lower bound is $$k \geq 2p \qquad (2)$$

Clearly, expression (2) is greater than expression (1) when $q$ is less than or equal to $2^p$. In a given case $k$ must be greater than or equal to the greater of the two bounds. It is noted that $q$ must for all cases considered herein be equal to or greater than 3.

A number of error codes are available for providing the desired error detecting and correcting capabilities. Illustrative of these available error codes are the ones described in the above-identified Hamming-Holbrook patent and, also, those described in "Recurrent Codes: Easily Mechanized, Burst-Correcting, Binary Codes," by D. W. Hagelbarger, The Bell System Technical Journal, volume 38, July 1959, pages 969–984.

The suitability of the Hamming-Holbrook error codes is evident when it is realized that, since errors are confined to a single row in the matrix of FIG. 4B, each column of the matrix can contain at most a single error. Therefore, Hamming-Holbrook single error correcting codes applied to each column independently would satisfy the error correcting requirements specified herein.

Additionally, suitable error correcting codes can be constructed by empirical methods, in view of the end requirements therefor set forth herein. Illustrative of the codes which can be constructed by such methods, and the ones according to which the specific embodiment of the principles of this invention which is described herein was implemented, are the ones represented in FIG. 4C, three families of these codes being shown for various values of $p$ and $q$. Note that the matrix displayed for family No. 1 in FIG. 4C is a 2×5 matrix. However, if a 2×4 or a 2×3 matrix is desired, one simply omits the last row or the last two rows, respectively, of the 2×5 configuration. Similarly, the matrix representations of families Nos. 2 and 3 may, of desired, be selectively reduced in size.

In FIG. 4C, each digit position is marked by an X and is identified by a number including one, two, three, or four decimal digits. The digit positions that are identified by single digits are check digit positions, all the other or multidigit positions being information digit positions. Further, the digits associated with an information digit position indicate the parity check groups into which the information digit enters. Thus, for example, in family No. 1 of FIG. 4C, the digit set associated with the lower right-hand position is 123, indicating that that position contains a binary information digit which enters into the formation of parity check groups 1, 2, and 3.

Figure 2A:
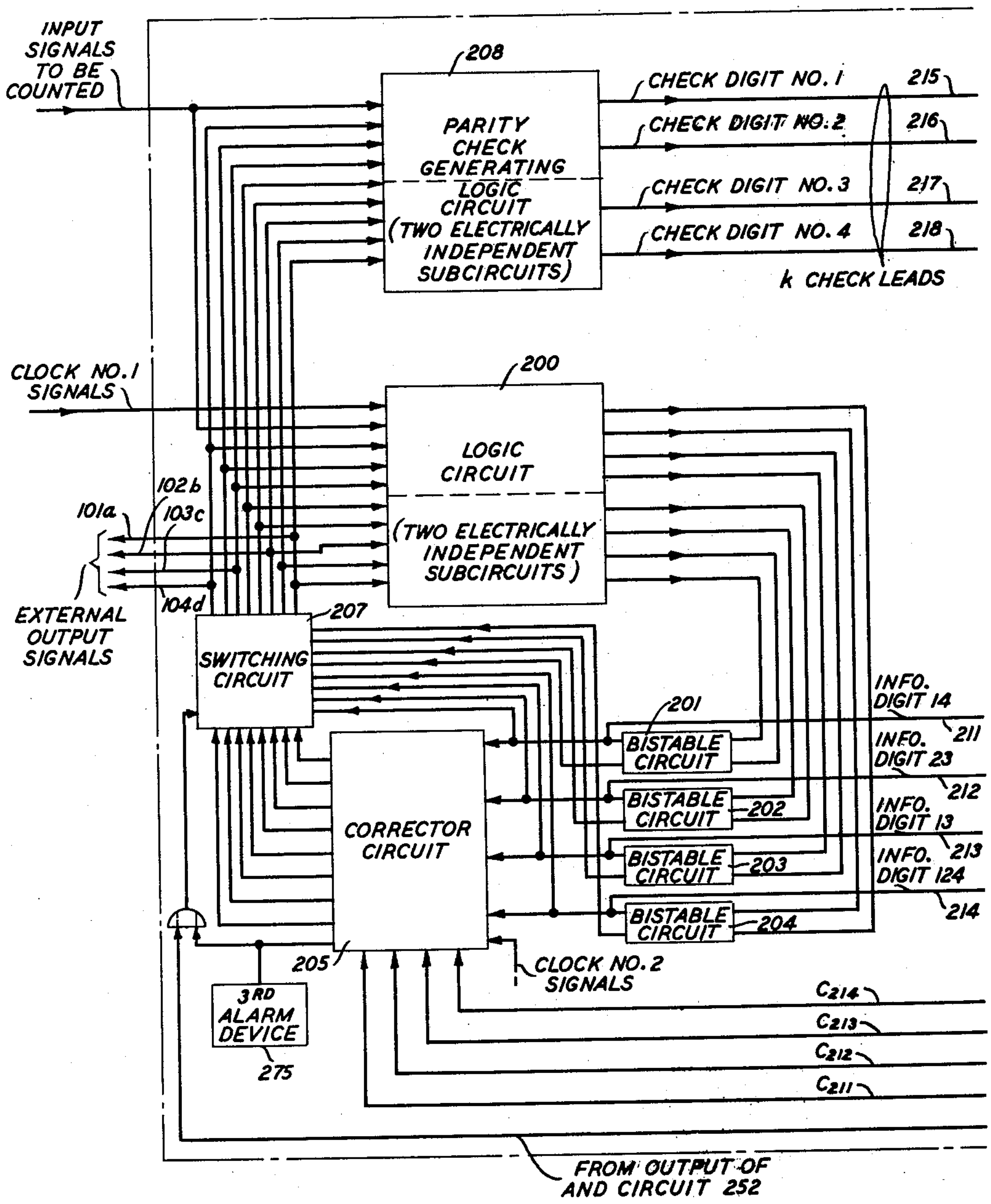
Figure 2B:
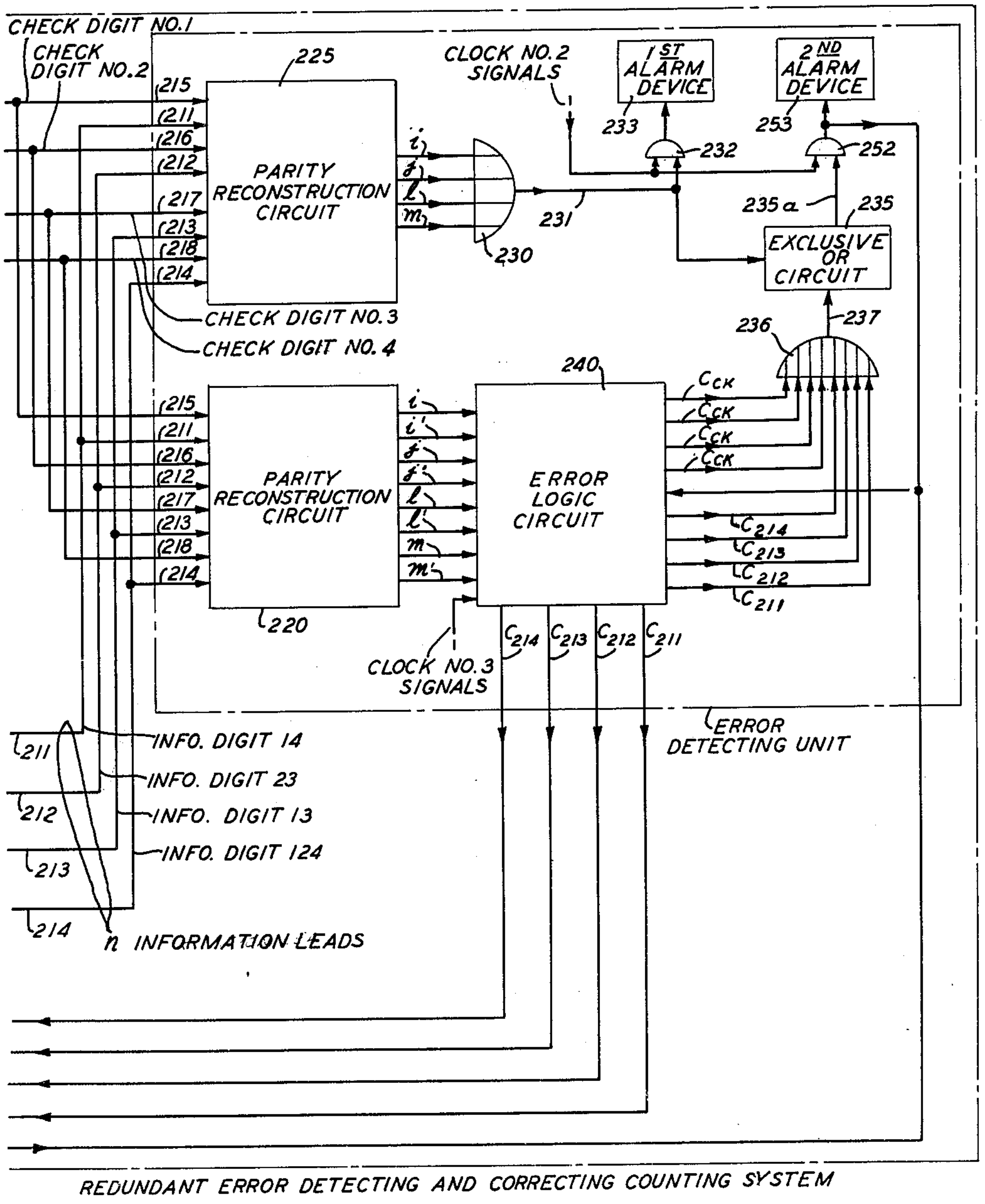

Looking now at FIGS. 2A and 2B, there is shown a redundant error detecting and correcting counting system made in accordance with the principles of the present invention. The system includes a logic circuit 200 and bistable circuits 201, 202, 203, and 204. The circuits 200 through 204 may be identical to those shown in the non-redundant system of FIG. 1 except that the logic circuit 200 is arranged in an electrically-independent form, as shown in FIG. 3C.

The unprimed output signals of the bistable circuits 201 through 204 of FIG. 24A are coupled both to a corrector circuit 205 of FIG. 2A and to parity reconstruction circuits 220 and 225 of FIG. 2B. Each of the circuits 205, 220, and 225 includes inverter units for converting the signals coupled thereto to a two-rail mode of representation.

Output signals from the corrector circuit 205 of FIG. 2A are coupled in two-rail form to a switching circuit 207 which also has applied thereto the unprimed and primed output signals of the bistable circuits 201 through 204. The switching circuit 207 provides at its output terminals either the signals received from the corrector circuit 205 or the signals received from the bistable circuits 201 through 204, depending respectively on whether the error detecting and correcting circuits of the system are functioning properly or not.

The output terminals of the switching circuit 207 are connected to external output leads 101*a*, 102*b*, 103*c*, and 104*d*, to the input terminals of the logic circuit 200, and to the input terminals of a parity check generating logic circuit 208. Also coupled to the circuits 200 and 208 are input signals to be counted. Also, clock No. 1 signals are coupled to logic circuit 200 only.

The leads 211 through 214 couple the bistable circuits 201 through 204 of FIG. 2A to the parity reconstruction circuits 220 and 225 of FIG. 2B and are the leads on which are propagated the information signals which are to be parity-checked by the parity circuit 208. At a given instant of time, four information signals appear on the leads 211 through 214. Therefore, a suitable error code matrix therefor must include at least four information digit positions. An inspection of FIG. 4C indicates that the 2×4 matrix of family No. 1 includes four such positions and requires four check digits. Accordingly, the parity check circuit 208 of the specific system disclosed herein has been formed so as to implement the 2×4 matrix of family No. 1 of FIG. 4C.

For family No. 1 *p* equals 2. Therefore, the circuits 200 and 208 of FIG. 2A are divided into electrically-independent subcircuits each including two output leads. More specifically, the selected matrix of FIG. 4C indicates that group No. 1 includes the leads carrying check digits numbers 1 and 2, that group No. 2 includes the leads carrying check digits numbers 3 and 4, that group No. 3 includes the leads carrying two of the information digits, and that group No. 4 includes the leads carrying the other two of the information digits. In FIGS. 2A and 2B group No. 1 includes the leads 215 and 216, group No. 2 includes the leads 217 and 218, group No. 3 includes the leads 211 and 212, and group No. 4 includes the leads 213 and 214.

As seen in the 2×4 matrix of family No. 1 of FIG. 4C, the first check digit (i.e., the one which appears on the lead 215 of FIGS. 2A and 2B) is derived from those information digits which are located in the information digit positions designated 14, 13, and 124. Therefore, assuming for illustrative purposes that an even parity relationship is employed throughout herein, the sum modulo 2 of the digits in positions 1, 14, 13, and 124 should be zero. Similarly, the sum modulo 2 of the digits in positions 2, 23, and 124 should be zero, that of the digits in positions 3, 23, and 13 should be zero, and that of the digits in positions 4, 14, and 124 should also be zero. The check signals which appear on the leads 215 through 218 to satisfy the above-specified relationships are listed in FIG. 5 for each of the sixteen states of the redundant counting system of FIGS. 2A and 2B. Given this list or truth table, the information as to what the inputs to the circuit 208 are, the requirement that the circuit 208 be divided into two electrically-independent subcircuits, and the design techniques described in the above-cited Caldwell textbook, the circuit 208 may easily be implemented by one skilled in the art.

It is noted that, although in the specific example described herein no one electrically-independent subcircuit provides on its output leads both information and check signal, the output leads of an electrically-independent subcircuit may in some cases within the scope of the principles of the present invention carry both types of signals. For example, if a matrix which included the top five rows of family No. 2 of FIG. 4C were required for a particular case, it is evident that each of the five electrically-independent groups thereof would include both information and check signals.

Figure 8:
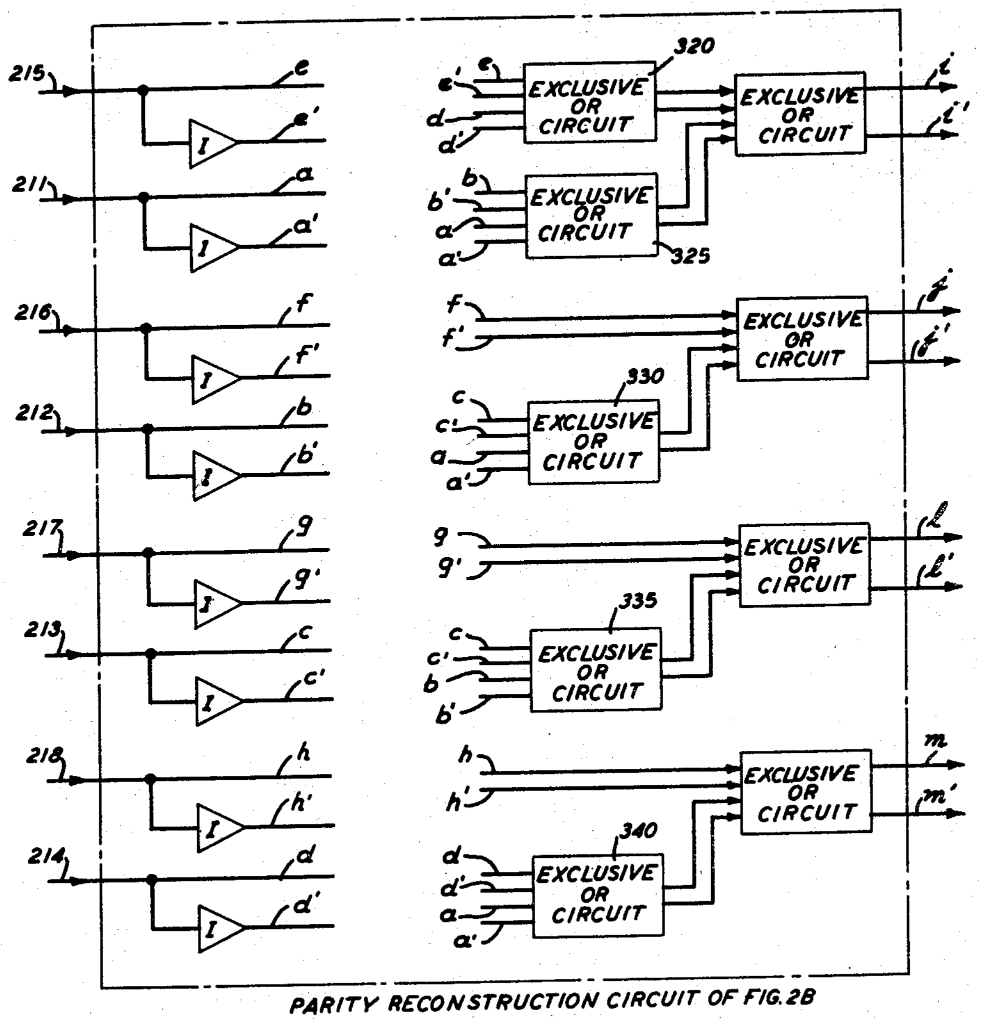
FIG. 8 is a schematic diagram of one of the two parity reconstruction circuits of FIG. 2B.

The information signals from the bistable circuits 201 through 204 and the check signals from the parity circuit 208 are coupled to an error detecting unit (FIG. 2B) which includes the parity reconstruction circuits 220 and 225. The circuit 220 is shown in FIG. 8. The circuit 225 is identical thereto except that the output leads marked *i'*, *j'*, *l'*, and *m'* are not needed for the circuit 225.

The parity reconstruction circuits 220 and 225 of the error detecting unit of FIG. 2B reconstruct the parity checks imposed by the parity circuit 208 of FIG. 2A and determine which, if any, of these parity checks have failed. If no parity check have failed a "0" signal appears on each of the output leads *i*, *j*, *l*, and *m* of the parity reconstruction circuits 220 and 225 and a "1" signal appears on each of the output leads *i'*, *j'*, *l'*, and *m'* of the circuit 220. This pattern of output signals from the parity reconstruction circuits 220 and 225 indicates that the parity circuit 208 and the information-generating equipment comprising the logic circuit 200 are operating correctly, i.e., no errors are occurring therein.

If, on the other hand, an error occurs in either one of the circuits 200 and 208 of FIG. 2A, one or more of the parity checks imposed by the circuit 208 would be found by the error detecting unit to be in error. Such an error causes "1" signals to appear on selected ones of the output leads *i*, *j*, *l*, and *m* of the parity reconstruction circuits 220 and 225 of FIG. 2B and "0" signals to appear on corresponding ones of the output leads *i'*, *j'*, *l'*, and *m'* of the circuit 220.

The "1" signal outputs of the parity reconstruction circuit 225 cause an OR unit 230 to provide a "1" signal on its output lead 231. Then, following the occurrence of a clock No. 2 signal, this "1" signal output of the OR unit 230 is gated through an AND unit 232 to a first alarm device or circuit 233, thereby to provide an audible and/or visual indication of the occurrence of an error in one of the circuits 200 and 208. Also, the signal appearing on the lead 231 is applied to an EXCLUSIVE-OR circuit 235, which provides or does not provide a "1" signal on its output lead 235*a* depending respectively on whether the signal on the output lead 237 from OR unit 236 disagrees or agrees with the signal on the lead 231.

Figure 9:
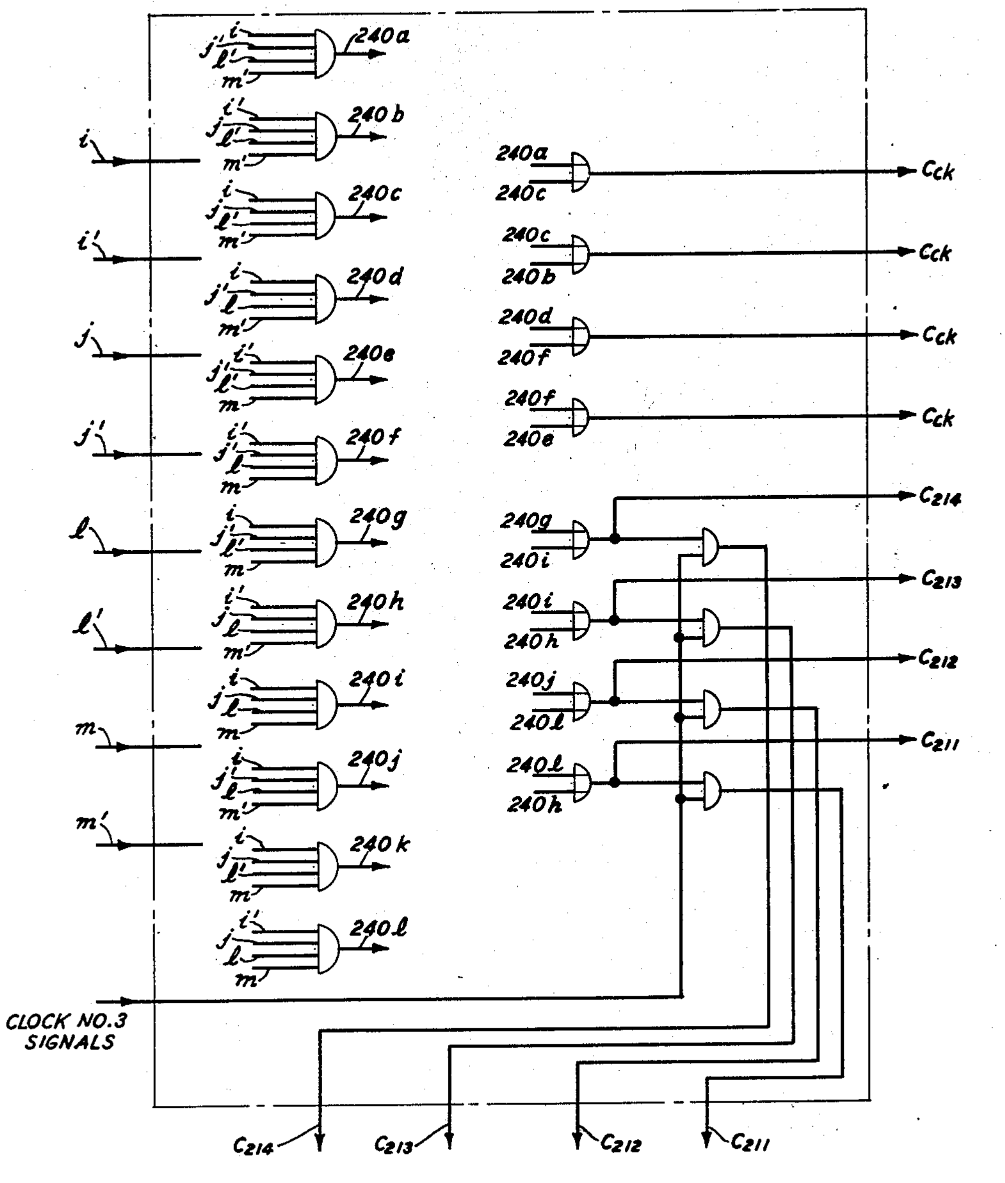
FIG. 9 is a schematic diagram of the error logic circuit shown in FIG. 2B.

The pattern of parity check failure signals from the parity reconstruction circuit 220 is coupled to an error logic circuit 240 which determines which ones of the leads 211 through 218 are carrying erroneous signals. This determination is based on the fact that in the illustrative error codes according to which the parity circuit 208 is formed there is always a one-to-one correspondence between the pattern of parity check failures and the failure pattern of the check and information digits on the leads 211 through 218. Thus, the error logic circuit 240, which is depicted in detail in FIG. 9, provides at least one "1" signal on the output leads therefrom which are designated $C_{CK}$ if one or more of the parity check signals are in error, and provides at least one "1" signal on the output leads therefrom which are designated $C_{211}$, $C_{212}$, $C_{213}$, and $C_{214}$ if one or more of the information signals are in error. Note that the occurrence of one or more "1" signal outputs from the error logic circuit 240 causes the OR unit 236 to apply a "1" signal to the EXCLUSIVE-OR circuit 235. Thus, an error which arises from a fault in either the circuit 200 or the circuit 208 causes both of the OR units 230 and 236 to provide "1" signals at their outputs and causes a "0" signal to appear at the output of the EXCLUSIVE-OR circuit 235, so that upon the occurrence of a clock No. 2 signal a second alarm device or circuit 253 is not energized. Accordingly, energization of only the first alarm device 233 indicates that the fault lies in one or the other of circuits 200 and 208.

Upon the occurrence of a clock No. 3 signal, correction signals for the information digits are selectively applied to the output leads $C_{211}$ through $C_{214}$ of the error logic circuit 240 of FIG. 2B. These correction signals are coupled to the corrector circuit 205 of FIG. 2A where the actual correction of information signals takes place.

If the information digit signals are correct but one or more of the check digit signals is in error, it is not necessary to correct erroneous check signals, since these signals perform no useful function external to the illustrative system described herein. Note that correct external output signals continue under such circumstances to be applied to the leads 101*a*, 102*b*, 103*c*, and 104*d* of FIG. 2A. In such a case, only error detection, viz., energization of the first alarm device 233 of FIG. 2B, occurs.

Figure 11:
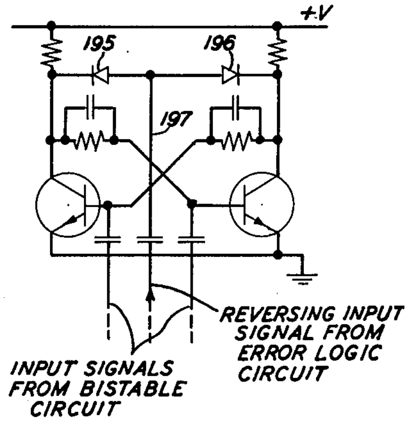
FIG. 11 depicts one possible implementation of the 3-input bistable circuit included in the showing of FIG. 6.
Figure 6:
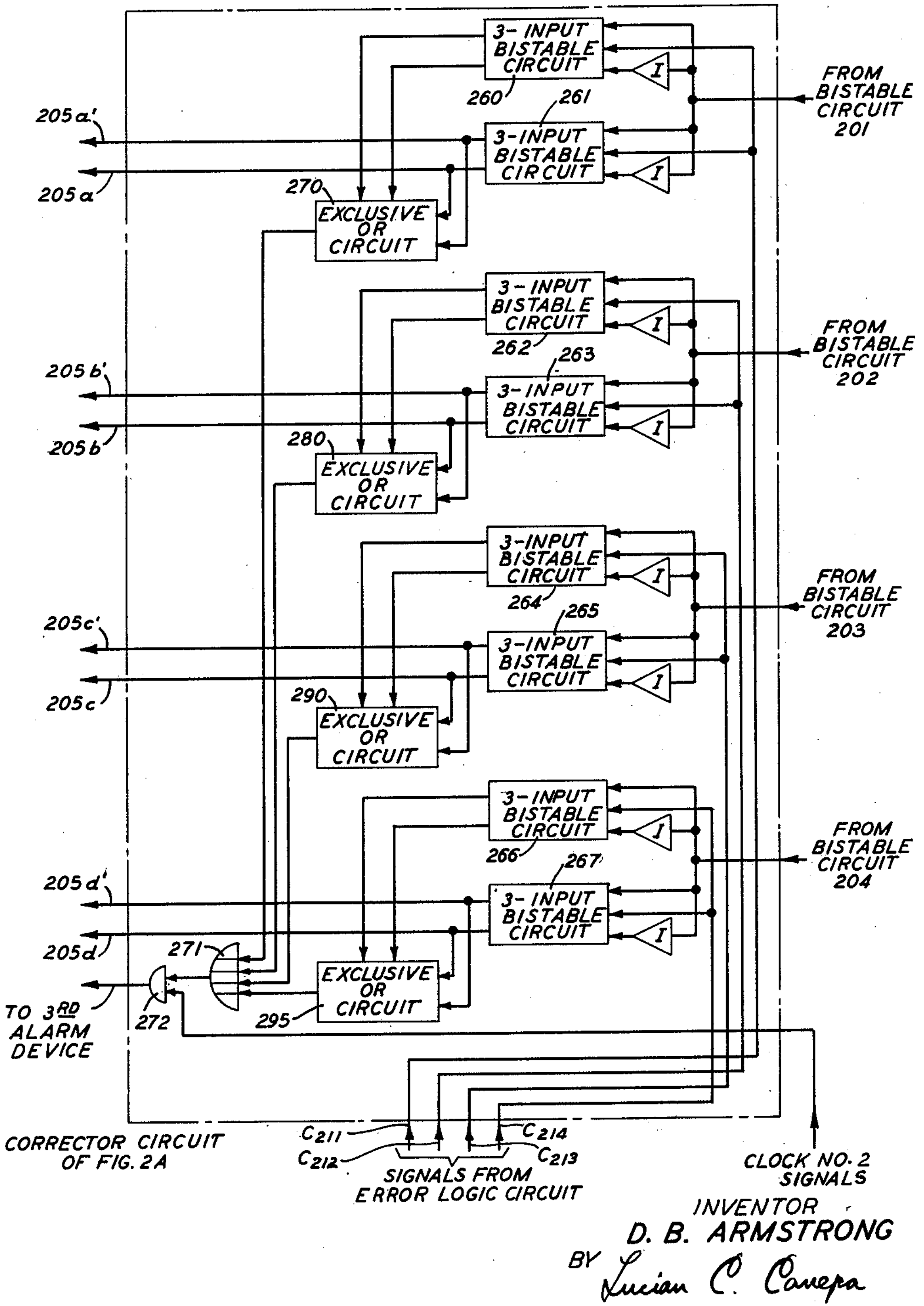
FIG. 6 is a schematic diagram of the corrector circuit shown in FIG. 2A.
Figure 7:
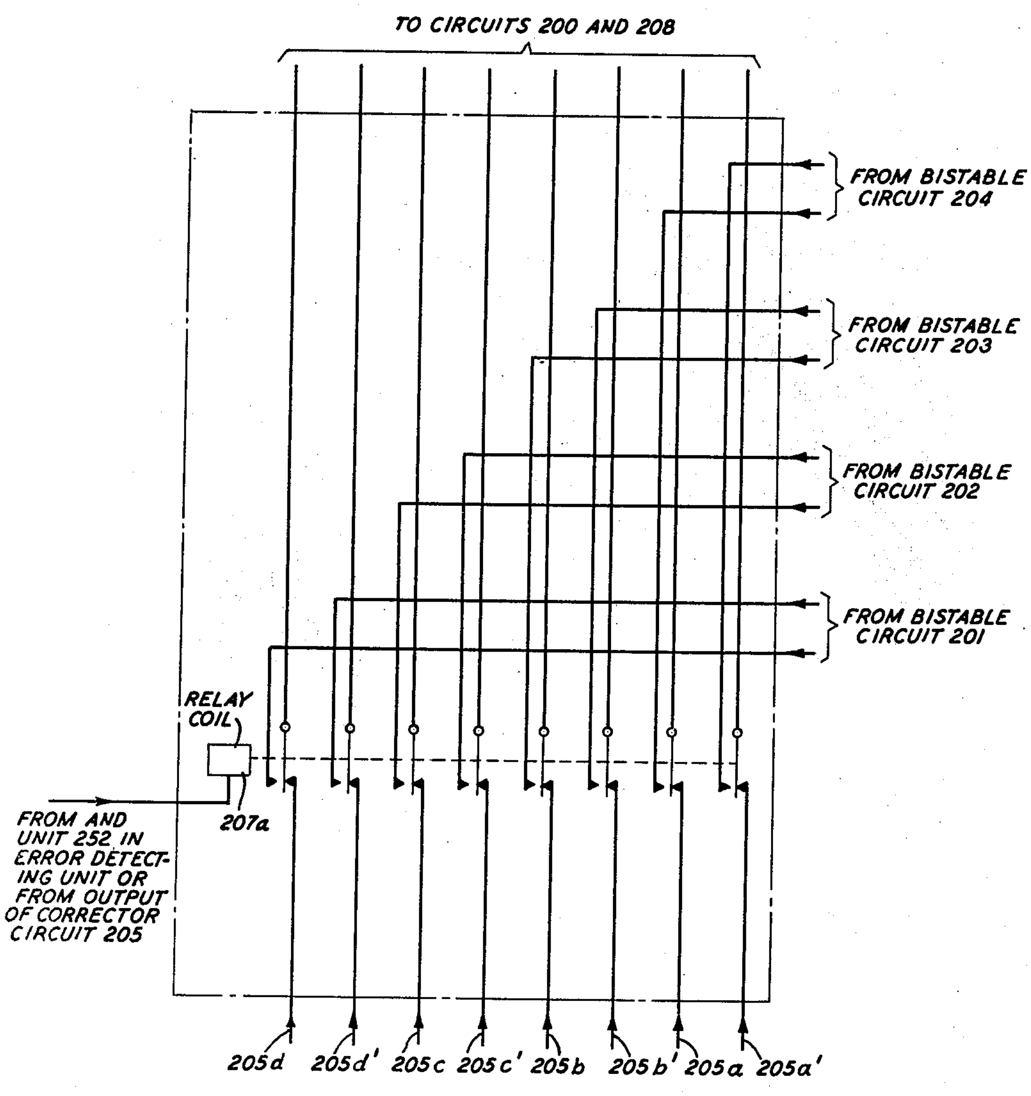
FIG. 7 is a schematic diagram of the switching circuit shown in FIG. 2A.

As noted above, the correction of erroneous information digits takes place in the corrector circuit 205 of FIG. 2A. The circuit 205, which is shown in FIG. 6, includes 3-input bistable circuits 260 through 267 which advantageously may be of the form shown in FIG. 11. Such a bistable circuit, which comprises a conventional cross-coupled transistor bistable circuit to which have been added diodes 195 and 196 and a third input lead 197, will switch to its opposite state when a "1" signal is applied to its middle input terminal. Thus, for example, a "1" signal output from the bistable circuit 201 sets or maintains the duplicate circuits 260 and 261 (FIG. 6) in their "1" states, thereby to provide a "1" signal on the output lead 205*a* and a "0" signal on the output lead 205*a'*. If the error detecting unit should detect that the output of the bistable circuit 201 is in error, a "1" correcting signal appears on the lead $C_{211}$ to switch the 3-input bistable circuits 260 and 261 to their opposite or "0" states, thereby to provide corrected signals on the leads 205*a* and 205*a'*. These corrected signals are coupled via the switching circuit 207, which is shown in FIG. 7, to the logic circuit 200 and the parity circuit 208.

Thus, a single error which arises from the occurrence of a fault in either the circuit 200 or the circuit 208 of FIG. 2A is detected by energization of the first alarm device 233 of FIG. 2B and is automatically corrected if the error is an erroneous information digit signal.

Aside from the above-described detection of errors which arise from a fault in either the circuit 200 or the circuit 208, as well as corerction of those arising in circuit 200, the system of FIGS. 2A and 2B is capable of detecting errors which arise from a fault in either the error detecting unit or the corrector circuit 205. Assume that erroneous "1" signals appear at the output terminals of the parity reconstruction circuit 225 at a time when they should not, i.e., when the circuits 200 and 208 are operating properly. This will cause a "1" signal to appear on the lead 231, which upon the occurrence of a clock No. 2 signal is gated through the AND unit 232 to energize the first alarm device 233. Since, for this situation, the signal on the lead 237 is a "0," a "1" signal appears on the lead 235*a*. This "1" signal will upon the occurrence of a clock No. 2 signal be gated through the AND unit 252 to energize the second alarm device 253. Thus, if the first and second alarm devices 233 and 253 are concurrently energized, the system of FIGS. 2A and 2B thereby indicates that the error detecting unit, and, more specifically, the parity reconstruction circuit 225 thereof, contains a fault.

If either the parity reconstruction circuit 220 or the error logic circuit 240 develops a fault, only the second alarm device 253 will be energized upon the occurrence of a clock No. 2 signal. Note that whenever alarm No. 2 is energized, the output of the AND unit 252 is coupled to a relay coil 207*a* of the switching circuit 207 (FIG. 7). This output energizes the coil 207*a* and thereby causes the circuit 207 to switch to the condition wherein it receives its input signals directly from the bistable circuits 201 through 204 rather than from the corrector circuit 205. This bypassing of the corrector circuit 205 is necessary because the circuit 205 may under such circumstances be receiving unreliable correction signals from the faulty error detecting unit.

Detection of a single error which arises from a fault in one of the 3-input bistable circuits 260 through 267 of the corrector circuit 205 of FIG. 2A is based on the fact that each pair of 3-input bistable circuits of FIG. 6 is coupled to a comparator or EXCLUSIVE-OR circuit. Thus, for example, the bistable circuits 260 and 261 are coupled to the EXCLUSIVE-OR circuit 270. The circuit 270 will, if the bistable circuits 260 and 261 are operating properly, have identical two-rail input signals applied thereto and, as a result, will provide a "0" output signal to an OR unit 271, so that upon the occurrence of a clock No. 2 signal no "1" will be gated through an AND unit 272 to a third alarm device or circuit 275.

On the other hand, if the output of the 3-input bistable circuit 261 of FIG. 6 should not match the output of the circuit 260, due to a fault in the circuit 261, the EXCLUSIVE-OR circuit 270 provides a "1" signal output which is coupled through the OR unit 271 to the AND unit 272. This "1" signal will upon the occurrence of a clock No. 2 signal permit the energization of the third alarm device 275 and cause the switching circuit 207 to transfer to the condition wherein it receives its inputs directly from the bistable circuits 201 through 204 rather than from the corrector circuit 205. This bypassing operation is necessary to avoid the transmittal of erroneous signals from the faulty corrector circuit 205 to the input terminals of the circuits 200 and 208.

Figure 10:
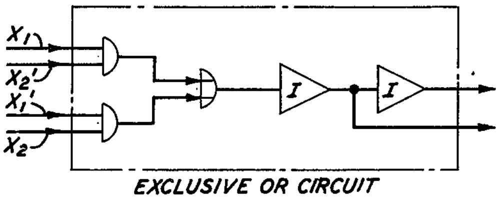
FIG. 10 depicts the configuration of an EXCLUSIVE-OR circuit of the type included in various circuits of the system shown in FIGS. 2A and 2B.

FIG. 10 shows an illustrative EXCLUSIVE-OR circuit which may be employed in the system shown in FIGS. 2A and 2B. More specifically, the circuit of FIG. 10 depicts the configuration of each of the circuits 320, 325, 330, 335, and 340 of FIG. 8. If FIG. 10 is modified to include only one output lead, the resulting configuration is that of each of the circuits 270, 280, 290, and 295 of FIG. 6. Further, if FIG. 10 is modified to include two additional inverters, to obtain the complements of the signals appearing on the leads 231 and 237 (FIG. 2B), the resulting configuration is that of the circuit 235 in the error detecting unit of FIG. 2B.

Some of the units included in the redundant system depicted in FIGS. 2A and 2B have not been described as being self-error detecting. Thus, for example, a fault in any one of the alarm circuits 233, 253, and 275 might indicate an erroneous circuit operation when in fact that circuit was operating correctly. To guard against this possibility, redundant techniques of the types disclosed in the above-identified Tryon patent coupled with regular maintenance procedures of the type disclosed in a copending application of B. R. Saltzberg, Serial No. 813,375, filed May 15, 1959, now Patent No. 3,016,517, issued Jan. 9, 1962, may advantageously be employed.

It is noted that the nonredundant system shown in FIG. 1 required only clock No. 1 signals, while the redundant system described herein requires clock No. 1, clock No. 2, and clock No. 3 signals, occurring in that order. Following the occurrence in the redundant system of a clock No. 1 signal, information and check digit signals are coupled to the parity reconstruction circuits 220 and 225 which, in turn, couple signals to the error logic circuit 240 and through the OR unit 230 to the AND units 232 and 252. Then, following the occurrence of a clock No. 2 signal, error detection, by selective energization of the alarm devices 233, 253, and 275 occurs. Finally, following the occurrence of a clock No. 3 signal, error correcting signals are gated out of the error logic circuit 240 to the circuit 205 where the actual correction operation takes place.

An illustrative system made in accordance with the principles of this invention performs error detection and correction provided that one fault at most occurs during a complete cycle of operation thereof, i.e., during the time between two clock No. 1 signals. Since a complete cycle of operation may typically be of the order of a microsecond, the probability of the occurrence of more than one fault per cycle is extremely small. In fact, by practicing efficient maintenance, diagnostic and repair routines, the probability of a second fault occurring before repair of a first fault is completed can also be kept extremely small.

In summary, there has been described herein a highly reliable system which, through the utilization of novel techniques of redundancy and electrical independence, possesses unique error detecting and correcting capabilities. It is emphasized that a complete maintenance routine, including efficient diagnostic procedures and rapid repair of faults, is an essential adjunct to the reliable operation of the described system; such as a routine is based on principles which are clearly known to those skilled in the art.

The specific illustrative redundant system described herein includes a somewhat sophisticated error detecting unit which has the ability to detect the occurrence of a fault within the unit itself. A less elaborate system that includes a unit which is not self-error detecting could easily be devised. Nevertheless, high reliability of such a less elaborate system could be achieved by applying preventive maintenance to the detecting unit at sufficiently frequent intervals to significantly reduce the possibility of the occurrence of a fault therein.

It is to be understood that the above-described arrangements are only illustrative of the application of the principles of the present invention. Numerous other arrangements may be devised by those skilled in the art without departing from the spirit and scope of the invention. For example, although emphasis herein has been directed to the application of the principles of the present invention to a sequential system, it is to be clearly understood that these principles are also applicable to combinational systems. Additionally, although the switching circuit 207 is described herein as being a relay circuit, it is, of course, clear that the circuit 207 may in some applications be advantageously implemented by employing therein electronic switching components.

What is claimed is:

In combination in a redundant error detecting and correcting system, a source for providing input signals, a logic circuit connected to said source for providing information signals, said logic circuit including a plurality of electrically-independent subcircuits each having *p* output terminals, where *p* is any positive integer, a parity circuit connected to said source for providing check signals each of which establishes a preassigned parity relationship with selected ones of said information signals, said parity circuit including a plurality of electrically-independent subcircuits each having *p* output terminals, first and second identical parity reconstruction circuits each having input terminals, means connecting the output terminals of said logic circuit and the output terminals of said parity circuit to respective ones of the input terminals of said first parity reconstruction circuit, means connecting the output terminals of said logic circuit and the output terminals of said parity circuit to respective ones of the input terminals of said second parity reconstruction circuit, an error logic circuit connected to said second parity reconstruction circuit for providing correction signals indicative of erroneous information signals, a corrector circuit responsive to said correction signals for providing corrected versions of said erroneous information signals, an output circuit connected to said corrector circuit for receiving correct infromation signals therefrom, means connecting the output terminals of said logic circuit to said corrector circuit, a detector circuit connected to said parity reconstruction circuits and to said error logic circuit for providing a first indication in response to the occurrence of a fault in one of the logic and parity circuits and for providing a second indication in response to the occurrence of a fault in the first parity reconstruction circuit and for providing a third indication in response to the occurrence of a fault in one of the second parity reconstruction and error logic circuits, and means connected to the output terminals of said logic circuit and responsive to the occurrence of either one of said second and third indications provided by said detector circuit for connecting the output terminals of said logic circuit directly to said output circuit.

References Cited in the file of this patent

UNITED STATES PATENTS

| | | |
|---|---|---|
| Re. 23,601 | Hamming et al. | Dec. 23, 1952 |
| 2,904,781 | Katz | Sept. 15, 1959 |